INVENTOR.
Shin-Ichi Kawada 3,327,185
STEPPING MOTOR CONTROL CIRCUIT
Shin-Ichi Kawada, Totsuka-ku, Yokohama, Japan, assignor to Kabushikikaisha Tokyo Keiki Seizosho (Tokyo Keiki Seizosho Co., Ltd.), Tokyo, Japan, a corporation of Japan
Filed Dec. 11, 1963, Ser. No. 329,747
Claims priority, application Japan, Dec. 15, 1962,
37/57,013
3 Claims. (Cl. 318—23.5)

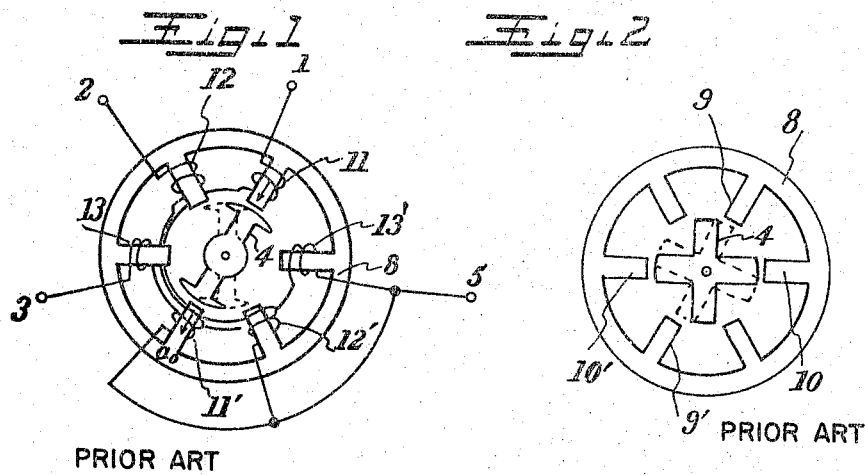
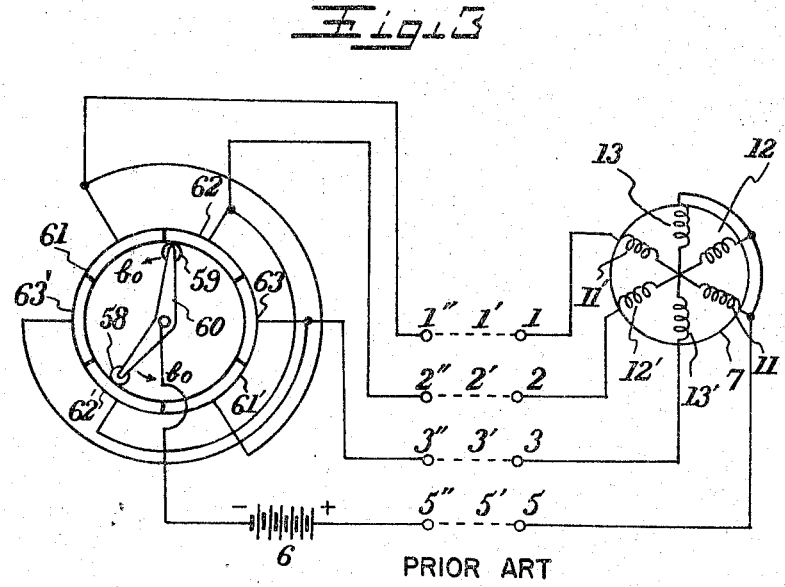

This invention relates to an actuator circuit for controlling a step motor which is used in remote transmission of angles, more particularly to a device which is connected at a preceding stage of the step motor and converts currents from a signal generator so as to be suitable for driving the step motor.

One object of the present invention is to provide an actuator circuit for a step motor in which even if signal currents to be supplied are feeble, they can be converted into suitable driving signals accurately corresponding to the currents.

Another object of the present invention is to provide an actuator circuit for a step motor which may be operated with a small current of such an extent as to produce no noises and dirt of contacts which are liable to be caused when employing a signal generator using mechanical contacts.

A further object of the present invention is to provide an actuator circuit for a step motor which may employ input signals of both DC currents and AC currents and may be operated when the level of the input current is small.

Another object of the present invention is to provide an actuator for a step motor which employs controlled rectifiers in its circuit and is so formed as to accurately control their switching to thereby effect accurate signal conversion.

Other objects, features and advantages of the present invention will become apparent from the following description taken in conjunction with the accompanying drawings, in which:

FIGURE 1 illustrates an example of a step motor to be used in the present invention;

FIGURE 2 illustrates another example of the step motor, with windings left out for the sake of simplicity;

FIGURE 3 is a connection diagram of a step motor control device heretofore employed;

FIGURE 6 illustrates an example of another signal generator different from that shown in FIGURE 4.

Figure 4:
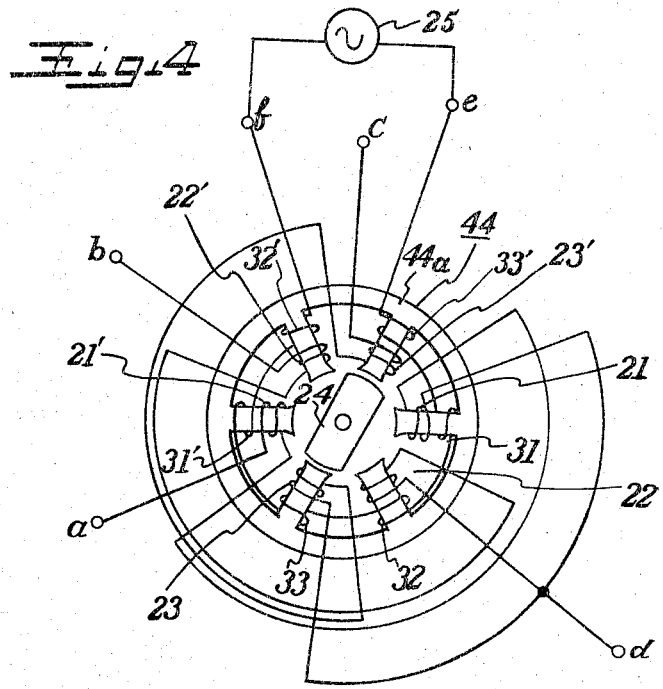
FIGURE 4 illustrates an example of a signal generator for step motor controlling use which is suitable for use in the present invention.

Before entering into the explanation of the present invention, I will hereinbelow explain a step motor and a signal generator for producing driving signals thereof which are usable in the present invention.

Referring to FIGURE 1, I will explain a step motor applicable to this invention. The stop motor shown in FIGURE 1 is provided with a stator core 8 having six magnetic pole pieces, in which an I-shaped rotor 4 formed of a magnetic material is supported rotatably maintaining a suitable air gap between the rotor and the stator. Mounted on the respective magnetic pole pieces of the stator 8 are windings 11, 12, 13, 11', 12' and 13', and the windings 11 and 11', 12 and 12', 13 and 13' on the confronting magnetic pole pieces are connected in series to each other respectively. Their polarities are selected such that when they are energized a magnetic flux $a_0$ may pass in series through the respective two magnetic pole pieces and the polarities of the inner ends of the adjacent magnetic pole pieces may be opposite. Each one end of the respective windings 11 and 11', 12 and 12', and 13 and 13' is connected to terminals 1, 2 and 3, and the other ends thereof are connected together and then connected to a terminal 5.

If now a DC voltage is applied between the terminals 1 and 5, the windings 11 and 11' are energized and by the magnetic field the rotor 4 is brought to a position shown in FIGURE 1. When the terminal 2 is connected to the terminal 1 and the windings 12 and 12' are energized together with the windings 11 and 11', the composite magnetic field moves to an intermediate position between the two magnetic poles, and hence the rotor 4 is attracted to a position bridging the two magnetic poles as shown by the dotted line. That is, when one circuit is energized the rotor stays on a line connecting the energized magnetic poles, and when two circuits are energized the rotor lies midway between the two magnetic poles. Therefore, by constructing the device in a manner such that the one end of the power source is connected to the terminal 5 and the other end thereof is switched to the terminals 1, 2 and 3 in a sequential order and during the switching two adjacent terminals among the terminals 1, 2 and 3 are simultaneously connected to the power source, the rotor 4 may successively be turned and stopped at a predetermined position, and further its revolution may be made reversible.

In a step motor illustrated in FIGURE 2 its rotor is formed in the same manner as that in FIGURE 1 but its rotor 4 is formed cross-shaped as shown in FIGURE 2. Windings and terminals to be connected thereto have been left out from this figure for the sake of simplicity. When magnetic poles 10 and 10' are magnetized the one pair of magnetic pole pieces of the rotor 4 become horizontal and stop at a place shown by the full line where they are aligned with the magnetic poles 10 and 10'. When magnetic poles 9 and 9' are magnetized together with the magnetic poles 10 and 10' at the same time, the rotor 4 revolves clockwise to the dotted-lined position where its adjacent magnetic pole pieces lie at an equal distance from the magnetic poles 9 and 10. Then, when the magnetic poles 9 and 9' alone are magnetized the rotor 4 rotates clockwise a little further and stops at a position where its full-lined magnetic pole pieces confront the magnetic poles 9 and 9'. After all, an angle of unit step in FIGURE 2 is just the half of that in FIGURE 1.

As a control circuit of the step motor described above, there has heretofore been employed such as illustrated in FIGURE 3. In the figure, a step motor 7 shown at the right schematically shows the step motor illustrated in FIGURE 1 or 2. Terminals 1, 2, 3 and 5 of the step motor 7 are respectively connected through leads 1', 2', 3' and 5' to terminals 1", 2", 3" and 5" of a signal generator illsutrated at the left in the figure. The signal generator is composed of six insulated arc electrodes 61, 62, 63, 61', 62' and 63' which have been arranged on the periphery of a circle and of a rotary electrode 60 two arms of which has a pair of roller electrodes 58 and 59 contacting on the arc electrodes. The rotor 60 is slightly bent as illustrated, namely it is formed in a manner so that when the roller 59 stays on the line of demarcation between the segments 61 and 62 the roller 58 lies at substantially the center of the segments 62'. The respective electrodes of the signal generators are connected together with a DC power source 6 as shown in the figure.

When the rotor 60 lies at a position such as illustrated in FIGURE 3, the rollers 58 and 59 are connected to the terminal 2" respectively through the segments 62 and 62', so that windings 12 and 12' alone of the step motor 7 are energized by the power source 6. If now the rotor 60 travels in the direction of the arrow $b_0$, namely in the counterclockwise direction, the roller 59 comes in contact with the segment 61 and is connected to the terminal 1". In this case the roller 58 still remains in contact with the segment 62' and hence the rotor 60 is connected through the terminnals 1" and 2" to the terminals 1 and 2. As a result of this, windings 11, 11' and 12, 12' of the step motor 7 are energized to thereby excite the two circuits simultaneously as described above. When the rotor 60 rotates further in the direction of the arrow $b_0$ the roller 58 moves in contact with the segment 61', exciting one circuit of the windings 11 and 11' alone. As the rotor 60 is thus rotated the rotor of the step motor 7 is also moved on successively in response to the rotation of the rotor 60, and when the rotor 60 is rotated in the opposite direction the rotor of the step motor 7 is also turned in the opposite direction. By connecting a plurality of step motors in parallel to the terminals 1", 2", 3" and 5", a plurality of step motors may be controlled simultaneously by the revolution of the rotor 60 of the single signal generator.

The control device shown in FIGURE 3 has long been used, but it is disadvantageous in the following points. The roller electrodes 58 and 59 are worn away in long use and powders produced by the wear weakens the insulation between the arc electrodes so that if regular repair is neglected, troubles are liable to occur. There is the possibility that when the rotor 60 revolves too fast the rollers 58 and 59 do not get in good contact with the arc electrodes. Furthermore, sparks are produced between the rollers 58, 59 and the arc electrodes, and hence the arc electrodes are also worn away. The present invention is intended to provide a step motor control device in which the aforementioned disadvantages may be removed effectively and it is extremely valuable in practical use.

FIGURE 4 also illustrates the structure of an improved signal generator which is suitable for use in the present invention, but this invention is not limited to the use of this example. The signal generator comprises a stator 44 provided with six magnetic pole pieces and a rotor 24 which is supported rotatably in the stator with a slight air gap therebetween. The stator 44 is composed of a cylindrical yoke 44a and six magnetic pole pieces disposed at regular intervals on the inside of the yoke. Primary windings 31, 32, 33, 31', 32' and 33' and secondary windings 21, 22, 23, 21', 22' and 23' are wound on the respective magnetic pole pieces. The stator 44 and the rotor 24 are such that an AC magnetic flux passes therethrough and they are formed of a material such as a lamination of thin iron plates or molded ferrite which are suitable for alternating magnetic flux. The primary windings are all connected in series to one another in a manner so that the polarities of respective adjacent magnetic poles may become opposite to each other, and their terminals $e$ and $f$ are connected to an AC power source 25.

The secondary windings 21 and 21', 22 and 22', 23 and 23' on the respective confronting magnetic pole piece are each connected together in series in pairs so as to add their respective induced voltages, their one-ends being connected together and connected to a terminal $d$ and the other ends being connected respectively to terminals $a$, $b$ and $c$.

When the rotor 24 is held at the position illustrated in FIGURE 4 a magnetic flux mostly passes through the magnetic pole pieces having the windings 33 and 33' wound thereon, so that a relatively large AC voltage is induced only in the windings 23 and 23' and this voltage is taken out between the terminals $c$ and $d$. Then when the rotor 24 is a little revolved, for instance anticlockwise and its upper and lower ends lie midway between two pairs of the magnetic pole pieces, substantially the same voltages are induced in the secondary windings 22 and 23, 22' and 23', producing an output voltage between the terminals $b$ and $d$ other than that between the terminals $c$ and $d$. As the rotor 24 is thus turned on an output voltage is produced successively between the terminals $c$–$d$, $c$–$d$ and $b$–$d$, $b$–$d$, $b$–$d$ and $a$–$d$, and $a$–$d$ in response to the position of the rotor.

Figure 5:
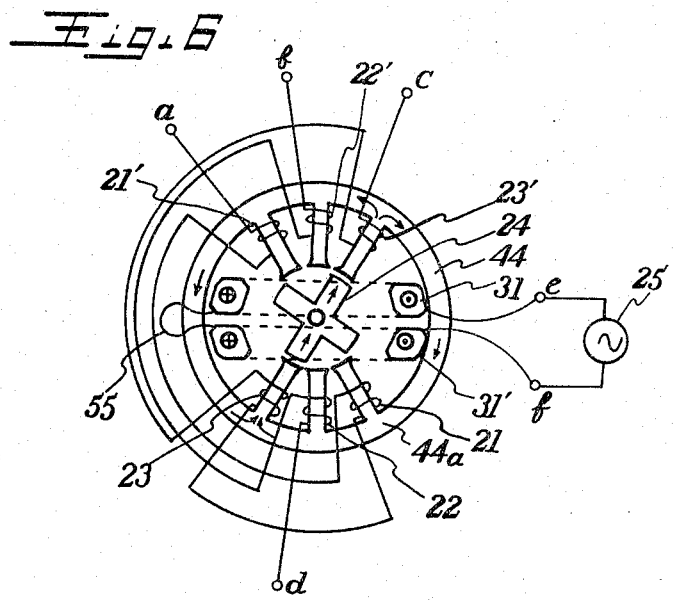
FIGURE 5 is a connection diagram illustrating an embodiment of the present invention.
Figure 5:
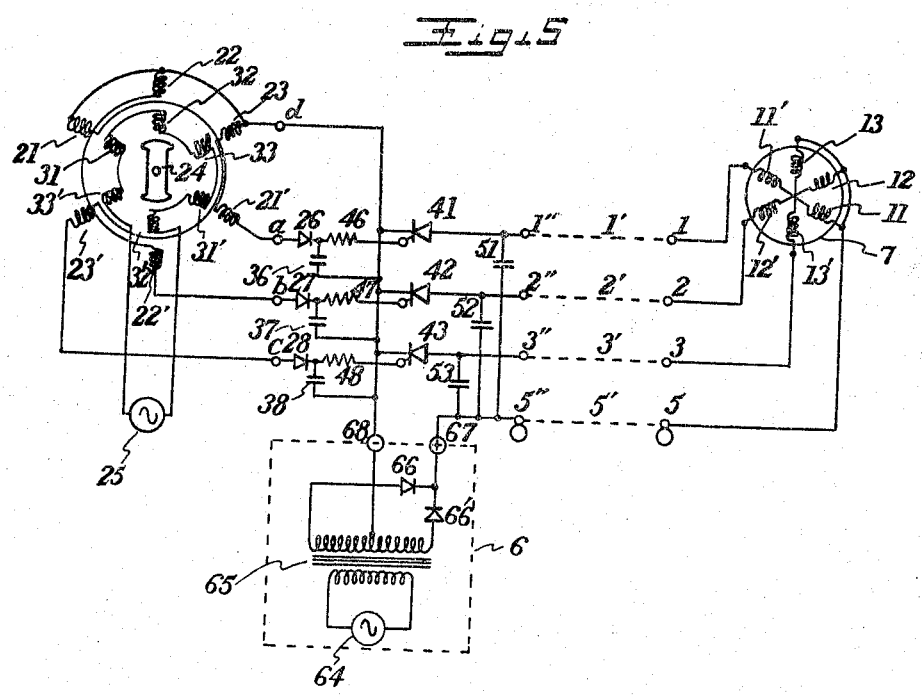

In FIGURE 5 illustrating an embodiment of the present invention, there is schematically shown a signal generator at the left which is the same as that in FIGURE 4 and there is also illustrated a step motor at the right which is similar to that in FIGURE 3. Between input terminals $a$, $b$, $c$ and $d$ and terminals 1", 2", 3" and 5" connected to input terminals 1, 2, 3, and 5 of the step motor, there is provided a control circuit as illustrated in the figure, which is composed of controlled rectifier elements 41, 42 and 43, capacitors 51, 52 and 53, diodes 26, 27 and 28, resistors 46, 47 and 48, capacitors 36, 37 and 38 and a ripple voltage power source 6. The power source 6 is illustrated in the form of a full-wave rectifier consisting of a usual AC power source 64, a transformer 65 and two rectifiers 66 and 66', and its one output terminal 67 is positive and the other output terminal 68 is negative. Between the terminals 1", 2", 3" and the negative terminal 68 of the power source 6, the controlled rectifier elements 41, 42 and 43 are respectively connected with the polarity as shown in FIGURE 5, the terminal 5" being connected to the positive terminal 67. The capacitors 51, 52 and 53 are connected respectively between the terminals 1", 2", 3" and the terminal 5". The terminals $a$, $b$ and $c$ are connected respectively to the gates of the controlled rectifier elements 41, 42 and 43 through the diodes 26, 27, 28 and the resistors 46, 47, 48. The capacitors 36, 37 and 38 are respectively connected in parallel with three circuits, each containing in series the above mentioned resistor and the gate circuit of the above mentioned controlled rectifier. The terminal $d$ is connected to the negative terminal 68 of the power source 6. The resistors 46, 47, 48 and the capacitors 36, 37 and 38 serve as a usual filter circuit. That is, three circuits, each containing in series a pair of windings of one phase of the step motor and a controlled rectifier element, are connected in parallel to the ripple current power source, and each one end of the capacitors 51, 52 and 53 are connected to the respective anode of the controlled rectifiers and all the other ends of the above capacitors are connected to the positive electrode 67 of the power source. The ripple current power source mentioned here is not always limited to a power source such that an alternating current of sinusoidal wave form is subjected to full-wave rectification as illustrated. Briefly, any power source may be used which produce pulsive currents such as rectangular wave form currents or triangular wave form currents. In some cases an alternating current can be also utilized. Generally an electrical power source the amplitude of the voltage of which is changed periodically can be available.

In the foregoing case, the silicon controlled rectifiers 41, 42 and 43 are used as the controlled rectifier elements, but any element which presents the same property and function may be employed.

If now the rotor 24 of the signal generator lies at the position shown in FIGURE 5, voltages are induced in the windings 22 and 22', producing an output AC voltage between the terminals $b$ and $d$. This voltage is rectified by the diode 27 to thereby charge the capacitor 37 and hence a D.C. current is produced from the diode 27 and the capacitor 37 to the terminal $d$ through the resistor 47, the gate and the cathode of the controlled rectifier element 42 and accordingly the element 42 becomes conductive. Then the windings 12 and 12' of the step motor 7 are energized by the voltage between the output terminals 67 and 68 of the power source 6. At the same time the capacitor 52 is gradually charged up to a peak voltage of the ripple voltage power source 6.

When the rotor 24 rotates 30 degrees in the clockwise direction from the illustrated position voltages are induced in the windings 23 and 23' other than the windings 22 and 22', producing output voltages at the terminals $b$ and $c$ against the terminal $d$. As a result, the windings 12, 12' and 13, 13' are energized simultaneously and the capacitor 53 is also charged up to a peak voltage of the ripple current power source 6. Then when the rotor 24 revolves further 30 degrees the output voltage between the terminals *b* and *d* disappears and hence the controlling current of the controlled rectifier element 42 is extinguished.

Generally the controlled rectifier element does not lose its conductivity after having once been made conductive, even if its controlling current is removed, and the conductivity is lost when the impressed voltage to the controlled rectifier is reduced to zero or reversed after the removal of the controlling current. In the present invention the ripple voltage power source 6 and the capacitors 51, 52 and 53 are for the purpose of operating the controlled rectifier elements in a manner suitable for their character described above. That is, when the voltage of the ripple power source 6 is nearly equal to its peak value the capacitor 52, for example, is charged through the element 42, but when the voltage of the power source 6 lowers, this voltage drops more rapidly than that of the capacitor 52 due to the discharging current passing through the windings 12 and 12'. As a result of this, an inverse voltage is impressed to the element 42 in response to the different between the two voltage and this inverse voltage becomes the largest when the voltage of the power source 6 goes down to a minimum. By this inverse voltage the conductivity of the element 42 is extinguished and even if the voltage of the power source 6 rises again and a positive voltage is applied to the element 42, it becomes no more conductive because the controlling current has already been extinguished. Thus the charge of the capacitor 52 is discharged through the windings 12 and 12' and the currents of the windings also disappear soon.

On the other hand, when the voltage of the power source 6 once drops an inverse voltage is also impressed to the element 43 and the element 43 loses its conductivity, but since the current of the gate circuit is maintained due to the presence of the output voltage between the terminals *c* and *d* the element 43 immediately becomes conductive to repeat the charge of the capacitor when the voltage of the power source 6 begins to rise again. Therefore the currents of the windings 13 and 13' continue to pass as long as the output voltage between the terminals *c* and *d* exists. With the successive shift of the output voltages of the terminals *a*, *b* and *c*, the voltages of the terminals 1, 2 and 3 also shift successively, so that the step motor 7 is operated in accordance with the rotor 24 of the signal generator.

Although the output waveform of the ripple voltage power source 6 has been previously described, it will hereinbelow be explained more in detail. The output waveform is not always required to be of full-wave rectification type such as shown in FIGURE 5. The waveform of half-wave rectification type may also be used and it is not necessarily requisite that its minimum voltage reaches zero. In short, the output waveform of the type such as to ripple up and down to some extent can be used. Furthermore, an AC voltage may be used which lowers negative. According to this invention as described above, signals produced by the signal generator are so converted as to be suitable for driving the step motor.

In FIGURE 6 illustrating another example of the signal generator which is suitable for use in the present invention, a stator 44 comprises a cylindrical yoke 44a and three pairs of magnetic pole pieces disposed on both the upper and lower sides of the yoke at intervals of 30 degrees centering around the axis. In this case the magnetic pole pieces are positioned concentrically with respect to a diameter across the axis of the rotor. Wound on them are three pairs of secondary windings 21 and 21', 22 and 22', 23 and 23' similar to those in FIGURE 4. A pair of primary windings 31 and 31' is disposed across the center of the cylindrical yoke and inner side thereof, at right angles to the diameter to which the magnetic pole pieces are placed concentrically. Their left-end leads are connected together by a tie line 55 and their right-end leads are connected to an AC power source through terminals *e* and *f*. A rotor core 24 is formed cross-shaped having four convex poles. If there is no such cross-shaped core 24, substantially the same magnetic fluxes are produced in the three pairs of magnetic pole pieces. Because of the rotor 24 magnetic fluxes are concentrated on one or two pairs of the magnetic pole pieces which the convex pieces confront, and accordingly output AC voltages are produced in the secondary windings only wound on these magnetic pole pieces. Thus the operation of the signal generator shown in FIGURE 6 is substantially the same as that in FIGURE 4. Features of the signal generator illustrated in FIGURE 6 reside in that since a greater number of turns of the primary windings can be wound the signal generator can be more available when the primary voltage is high and in that its manufacture is easy because it is sufficient merely to wind the secondary windings on the respective magnetic pole pieces. Furthermore the number of steps to be generated in one revolution is twice as large as that of the device shown in FIGURE 4.

A modification of the device in FIGURE 4 has the same operation as that in FIGURE 4, in which the number of magnetic pole pieces of a stator is a multiple of 6 such as 12, 24 and so on and secondary windings wound on the respective magnetic pole pieces are connected together in three groups by connecting every third winding in series in the same manner as that in FIGURE 4. In this case the number of steps in one revolution can be made sufficiently large. As to the device in FIGURE 6, a similar modification may be effected. In FIGURE 5, the input gate circuits of the respective controlled rectifier elements 41, 42 and 43 may be full-wave rectifier circuits using diode bridges in place of the half-wave rectifier circuits as illustrated in this figure.

According to this invention, the controlled rectifier elements are used for controlling the step motor so that a low level of current of the signal generator is enough to drive the step motor and its operation is ensured and no maintenance is required. Furthermore, the controlled rectifier elements may be operated rationally by using suitably the ripple voltage power source and the capacitors. In accordance with the present invention the current and voltage to be applied to the gate of the controlled rectifier element may be extremely feeble, and it may be an AC or a DC current. It must be noted that even if feeble currents without accompanying the aforementioned disadvantages of the rollor contact type signal generator is used when using the signal generator shown in FIGURE 3, desired conversion may be effected.

It will be apparent that many modifications and variations may be effected without departing from the scope of the novel concept of this invention.

What is claimed is:

1. A system for controlling the operation of a step motor comprising: a plurality of pole pieces associated with said step motor; a winding formed on each of said pole pieces to be selectively energized to selectively magnetize said form magnetic pole pieces; a rotor mounted in said step motor so as to have a potrion thereof in close proximity with certain ones of said pole pieces; a signal generator for producing signals indicative of rotary motion; a plurality of control rectifiers each having an anode, cathode and control electrode, said anode of each of said control rectifiers being connected to one end of one of said plurality of windings and said control electrode of each of said plurality of control rectifiers being connected to said signal generator; an amplitude variable power supply having positive and negative output terminals, said positive terminal being connected to the other end of said plurality of windings and said negative terminal being connected to each of said cathodes of said plurality of control rectifiers; and a capacitor connected between each of said anodes and said positive terminal of said power supply; whereby, the signals from said signal generator will sequentially render certain ones of said control rectifiers conductive to energize the corresponding ones of said windings to develop a magnetic field which, in turn, will cause said rotor to rotate in accordance with said signals, and when said signals are selectively removed from said certain ones of said control electrodes, said power supply and said capacitor associated with each of the corresponding ones of said control rectifiers serve to render the control rectifier non-conductive.

2. The system of claim 1 wherein said control rectifiers are silicon controlled rectifiers.

3. A control circuit for selectively applying control signals to a motor comprising energization means associated with said motor; at least one control rectifier having an anode, cathode and control electrode, said anode being connected to one end of said energization means and said control electrode being arranged to receive the control signal; an amplitude variable power supply having positive and negative output terminals, said positive output terminal being connected to the other end of said energization means and said negative output terminal being connected to said cathode; and a capacitor connected between said anode and said positive output terminal of said power supply; whereby, said control rectifier is rendered conductive by the signal and will remain conductive as long as the signal is applied to said control electrode, and said control rectifier is rendered non-conductive solely by the action of said power supply and said capacitor.

References Cited

UNITED STATES PATENTS

| | | | |
|---|---|---|---|
| 3,091,728 | 5/1963 | Hogan et al. | 318—254 |
| 3,214,663 | 10/1965 | Kreutzer | 318—138 |
| 3,229,179 | 1/1966 | Hetzel | 318—138 |

BENJAMIN DOBECK, *Primary Examiner.*

ORIS L. RADER, *Examiner.*